Patented May 11, 1937

2,079,613

UNITED STATES PATENT OFFICE 2,079,613

HYDROXYCYCLOALKYLAMMONIUM SALTS

Harold S. Holt, Wilmington, Del., assignor to E. I. du Pont de Nemours & Company, Wilmington, Del., a corporation of Delaware No Drawing. Application December 27, 1934, Serial No. 759,337

15 Claims. (Cl. 260—112)

This invention relates to new compositions of matter, more particularly to organic monobasic acid salts of hydroaromatic hydroxy amines, and still more particularly to salts of hydroaromatic hydroxy amines with organic monocarboxylic acids. It also relates to dispersing, wetting, and thickening agents comprising these salts and to compositions containing such dispersing, wetting, and thickening agents.

This invention has as an object the preparation of organic monobasic acid salts of hydroaromatic hydroxy amines. A further object is the preparation of dispersing, wetting, and thickening agents by combining organic acids and particularly aliphatic monobasic acids with suitable hydroaromatic hydroxy amines. A still further object is the preparation of useful compositions containing the amine salts as herein disclosed.

These objects are accomplished by the following invention wherein there is formed an ammonium salt of an organic monobasic acid wherein at least one ammonium hydrogen is replaced by a monovalent organic radical containing, attached to the nitrogen atom, a hydroxyl substituted hydroaromatic ring. This salt may then be used in the preparation of emulsions and the like, and as a dispersing, wetting, or thickening agent.

It has been found that hydroaromatic hydroxy amines react readily with organic monobasic acids to form salts. Reaction occurs between the carboxyl or other acid group of the acid and the amino group of the hydroxy amine and essentially involves the addition of the two materials to form a salt. The reaction conditions favoring salt formation are low temperatures (50–100° C.) and a short period of heating. High temperatures and long periods of heating lead to the formation of other reaction products such as amides whose properties differ from those of the salts. The following examples are given to illustrate the preparation of salts of hydroaromatic hydroxy amines. The methods of preparation described below are generally applicable:

*Example 1.—o-Hydroxycyclohexylammonium stearate*

Twenty-eight and four-tenths grams of stearic acid was melted on a steam bath at a temperature of about 85° C. To the molten mass was added 11.5 gm. of molten o-aminocyclohexanol at such a rate that the temperature of the mixture did not rise above 85° C. (The reaction is exothermic and the temperature tends to rise rapidly if the amine is added rapidly). The mixture was stirred during addition of the amine. After all of the amine had been added the mixture was poured into a cold shallow tray and allowed to cool. The reaction product on cooling solidified to a light yellow, brittle, resinous solid which melted at 72–78° C. The yield was quantitative.

o-Hydroxycyclohexylammonium stearate dissolves in both aqueous and non-aqueous solvents, e. g., water or benzol. The aqueous solutions on cooling show a tendency to thicken and have a high viscosity. Solutions in gasoline set to a jelly on cooling.

*Example 2.—o-Hydroxycyclohexylammonium isobutyrate*

A mixture of 17.6 gms. of isobutyric acid and 23 gms. of o-aminocyclohexanol was warmed on a steam bath until a homogeneous melt was formed. The melt soon became pasty in nature and on cooling set to a granular amorphous solid. This solid was shaken with benzene, and the insoluble material filtered off. The benzene-insoluble solid was washed with ether and dried giving a fluffy gray-white solid melting at 110–112° C.

o-Hydroxycyclohexylammonium isobutyrate is easily soluble in water and in warm benzene. It is only slightly soluble in gasoline.

*Example 3.—o-Hydroxycyclohexylammonium levulinate*

A mixture of 11.6 gms. of levulinic acid and 11.5 gms. of o-aminocyclohexanol was heated on a steam bath until a homogeneous melt was obtained. The reaction mixture on cooling set to an amorphous solid which was purified by washing with ether. On drying the ether washed material, an amorphous hydroscopic solid melting at about 70–80° C. was obtained. o-Hydroxycyclohexylammonium levulinate is soluble in water, alcohol, and warm benzol and insoluble in gasoline.

*Example 4.—o-Hydroxycyclohexylammonium naphthenate*

Eighteen and six-tenths grams of naphthenic acids (B. P. 90–145° C. at 5 mm.; acid no. 300; molecular weight 186) was mixed with 11.5 gms. of o-aminocyclohexanol. An exothermic reaction took place giving a viscous dark colored oily material soluble in water, gasoline, and benzol and having emulsifying and foaming properties.

*Example 5.—o-Hydroxycyclohexylammonium abietate*

Thirty and two-tenths grams of abietic acid and 11.5 gms. of o-aminocyclohexanol were dissolved in 50 gms. of benzol and the solution heated to 70° C. on a steam bath. The aminocyclohexanol salt of abietic acid was recovered by evaporating the benzol. It was a brittle, semi-resinous product. It was soluble in water and benzol and insoluble in gasoline.

*Example 6.—Monophenylcyclohexanolammonium stearate*

A mixture of 28.4 gms. of stearic acid was heated on a steam bath with 19.1 gms. of o-monophenylcyclohexanolamine (o-phenylaminocyclohexanol, 2-$C_6H_5NH$—$C_6H_{10}$—OH-1) until a homogeneous melt was obtained. The reaction product became jelly-like and on cooling set to a white solid having a waxy feel. M. P. 45° C.

Monophenylcyclohexanolammonium stearate is insoluble in water and soluble in benzol and gasoline.

*Example 7.—Monophenylcyclohexanolammonium salt of branched chain aliphatic monocarboxylic acids having nine carbon atoms*

The acids referred to above are branched chain monocarboxylic acids containing nine carbon atoms and are obtained by the oxidation of higher alcohols which are a by-product in the high pressure methanol synthesis. These acids had a molecular weight of 159.

Fifteen and nine-tenths grams of the acids referred to above were mixed with 19.1 gms. of o-monophenylcyclohexanolamine (o-phenylaminocyclohexanol, 2-$C_6H_5NH$—$C_6H_{10}$—OH-1) and the mixture was heated on a steam bath until a homogeneous melt was obtained. The reaction product on cooling was a reddish oily liquid soluble in benzol and gasoline and insoluble in water.

*Example 8.—β-naphthalenesulfonic acid salt of o-aminocyclohexanol*

Twenty and eight-tenths grams of β-naphthalene sulfonic acid was suspended in a 50/50 mixture of benzol and the dimethyl ether of ethylene glycol (dimethyl cellosolve) and the suspension was heated on a steam bath at the boiling point of the benzol. To the heated suspension was added 11.5 gms. of o-aminocyclohexanol. An oil separated from the solvent mixture. This oil slowly solidified. The solid material was filtered and washed with benzene. The reaction product obtained in this manner melted at 156–160° C. It was soluble in water and alcohol and insoluble in benzol and gasoline.

*Example 9.—Dodecylsulfuric acid salt of o-aminocyclohexanol*

A mixture of 19.7 gms. of dodecyl alcohol and 11.5 gms. of chlorosulfonic acid was warmed gently, nitrogen being passed thru the reaction mixture to remove hydrogen chloride as rapidly as it was formed. The resulting dodecylsulfuric acid was mixed with 11.5 gms. of aminocyclohexanol and the mixture warmed on a steam bath for a few minutes. The amine salt obtained in this manner set to a light brown paste on cooling. This salt was soluble in water, gasoline, and benzol and had emulsifying and foaming properties.

It is apparent from the preceding examples that a wide variety of organic acids will react with hydroaromatic hydroxy amines giving salts whose properties depend on the acid and amine used in preparing them. Salts prepared from the higher fatty acids, naphthenic acids and acids obtained in the oxidation of paraffin hydrocarbons as well as acids obtained by the sulfation of long chain alcohols, naturally occurring glycerides or petroleum hydrocarbons are soluble in aqueous and non-aqueous solvents, i. e., in water or benzol. Gasoline and water solutions of certain of the salts mentioned above, especially the fatty acid salts of o-aminocyclohexanol, have high viscosity due to the thickening action imparted. This thickening effect is obtained with concentration of amine salt as low as 2% in water and 5% to 10% in gasoline. These salts also have excellent emulsifying properties for a wide variety of hydrocarbon oils, fats, waxes, drying oils, synthetic resins, rubber, etc. The following examples will serve to illustrate typical applications for salts as disclosed above.

*Example 10.—Hydrogenated glyceride emulsion*

Ninety grams of hydrogenated castor oil was melted on a steam bath and 10 grams of o-hydroxycyclohexylammonium stearate was added. The mixture was stirred until homogeneous and was then poured while still hot into 500 cc. of water with constant stirring. The resulting emulsion was stable even after dilution with water to a 10% solids content. Emulsions of this type are useful for coating and impregnating paper, cardboard, fabrics, etc. and as polishes and insulating compositions.

*Example 11.—Hydrocarbon oil emulsion*

A solution of 1.44 gms. of stearic acid in 20 gms. of kerosene was prepared by warming the acid and kerosene on a steam bath. The resulting solution was emulsified by pouring slowly and with constant stirring into 80 gms. of water containing 0.44 gm. of o-aminocyclohexanol. Emulsions of this type are useful as insecticide bases, liquid polishes, etc.

*Example 12.—Synthetic resin emulsion*

Twenty grams of a polyhydric alcohol-polybasic acid resin containing 37% glyceryl phthalate, 47% linseed oil glyceride and 16% China wood oil glyceride was dissolved in 20 gms. of toluene and 1.4 gms. of dodecylsulfuric acid was added to the resulting solution. The above solution was then poured slowly and with constant stirring into 45 cc. of water containing 0.56 gm. of o-aminocyclohexanol. An emulsion of the resin and toluene in water resulted.

Emulsions of this type are useful as paints over plaster, cement, etc.

*Example 13.—Thickening agents for rubber latex*

One hundred grams of rubber latex (38% rubber) was shaken with 0.72 gm. of o-hydroxycyclohexylammonium stearate dissolved in 15 cc. of water. The latex immediately thickened up to such an extent that the container could be inverted without loss of its contents. Latex thickened in this manner is useful for the coating of paper, textiles, etc. since the high viscosity improves working properties and prevents penetration of the rubber into the interior of the products being coated.

*Example 14.—Dispersion control of pigments*

A black enamel consisting of 11.6% carbon black, 83.9% polyhydric alcohol-polybasic acid resin, and 4.5% solvent naphtha was prepared by grinding the above ingredients in the proportions given on a roller mill. The polyhydric alcohol-polybasic acid resin used was a drying oil modified resin containing 52% linseed oil glyceride and 48% glycerol phthalate. Ten grams of the above enamel and .093 gm. of o-aminocyclohexanol salt of dodecylsulfuric acid (8% based on the carbon black) were mixed with a spatula on a glass plate. After standing for 24 hours 5 grams of the sample was transferred to another glass plate which was then placed at an angle of 45°. A control experiment run on 5 grams of untreated black enamel was also made. The length of flow of the two samples on the glass plates was noted after a time interval of two minutes. The length of flow expressed in units of twentieths of an inch was 13 for the control and 46 for the enamel containing the amine salt. These figures represent the improvement in flowing properties and consistency of the enamel resulting from the use of the amine salt as a dispersion control agent. The use of amine salts as disclosed above therefore affords a method for improving the consistency of pigmented coating compositions. This results in better working properties at constant pigment content or allows the use of higher pigment contents (with consequent increase in hiding power) without sacrificing working properties. These properties can be utilized in connection with paints, lithographic inks, newsprint inks, etc.

The present application is not concerned with the preparation of hydroaromatic hydroxy amines themselves. These may be prepared by catalytic nuclear hydrogenation of amino phenols, by treating hydroaromatic chlorohydrins with alcoholic ammonia, or by treating hydroaromatic oxides with aqueous or liquid ammonia.

The salts of hydroaromatic hydroxy amines coming within the scope of the present invention may contain one or more hydroaromatic nuclei. Thus, the invention includes salts of hydroxy amines derived from cyclohexane, dicyclohexyl, decahydronaphthalene, decahydroanthracene, etc., e. g., 2-hydroxy-6-cyclohexylcyclohexylamine, 3-hydroxydecahydronaphthylamine-2, as well as their homologs or substitution products.

Salts of hydroaromatic hydroxy amines containing partially reduced nuclei also come within the scope of the present invention. These include hydroxy amines derived from tetrahydronaphthalene, tetrahydrodiphenyl, tetrahydrophenanthrene, etc. Where both aromatic and hydroaromatic nuclei are present, the hydroxyl and amino groups are both joined to one hydroaromatic nucleus. Examples of such polynuclear hydroaromatic hydroxy amines are 2-hydroxy-3-amino-1,2,3,4-tetrahydronaphthalene, and 1-hydroxy-2-amino-1,2,3,4-tetrahydrophenanthrene.

Coming within the scope of the present invention are also salts of secondary and tertiary hydroxy amines, such as are formed by reacting two or three molecules of a hydroaromatic oxide with one mol. of ammonia. These include dicyclohexanolamine, di-(ac-hydroxytetrahydro) naphthylamine, etc.

In addition, salts of secondary and tertiary amines such as N-alkyl, aryl, dialkyl, diaryl, aralkyl, alkylaryl, etc., hydroxycyclohexylamines are included. These include phenyl, benzyl, ethyl, N-phenyl-N-ethyl, etc. hydroxycyclohexylamines.

The invention is not limited to compounds in which the hydroxyl and amino groups are in the ortho position since salts formed from such compounds as p-hydroxycyclohexylamine formed by the catalytic reduction of p-aminophenol are within the scope of the invention. The invention is therefore generally applicable to primary, secondary, and tertiary amines and quaternary ammonium hydroxides wherein at least one hydrogen on the nitrogen is replaced by a hydroaromatic radical wherein both the nitrogen atom and the hydroxyl group are attached to one and the same hydroaromatic ring, i. e. a ring derivable from an aromatic compound by direct or indirect addition of hydrogen.

The invention is generally applicable to organic monobasic acids including the fatty acids such as stearic, palmitic, lauric and nonylic acids; unsaturated drying and semi-drying oil acids such as oleic, eleostearic, and linoleic acids; hydroxy acids such as hydroxystearic and ricinoleic acids; alicyclic acids such as naphthenic acid and abietic acid; sulfonic acids such as naphthalenesulfonic acid; acids obtained by sulfation of long-chain alcohols, e. g., dodecyl sulfuric acid or 9, 10-octadecenyl-sulfuric acid, as well as monobasic acids obtained by sulfating or oxidizing petroleum products. Monobasic acids such as dilauryl phosphoric acid are also applicable. Other acids falling within the scope of this invention include keto acids such as levulinic and benzoylbenzoic acids, as well as homologs and substitution products thereof.

Salts of hydroaromatic hydroxy amines with fatty acids, naphthenic acids, acids prepared by the oxidation of paraffin hydrocarbons, sulfated long-chain alcohols, sulfated naturally occurring glycerides, or sulfated petroleum products are useful as dispersing, emulsifying, and thickening agents. This renders them of use in the preparation of detergents, polishes, wax and hydrocarbon oil emulsions, insecticidal emulsions, cold water paints, and as thickening agents for rubber latex, as flotation reagents, as textile treating agents, as pigment treating agents to improve dispersibility and grinding properties, as rubber compounding ingredients, and the like.

The products of this invention possess a unique combination of emulsifying and thickening properties, especially when dissolved in water. The use of these products therefore results in the formation of unusually stable emulsions which are difficult or impossible to obtain with present known dispersing agents. Emulsions containing salts of hydroaromatic hydroxy amines can be diluted with water to a very low solids content without breaking. Even at low solids content these emulsions have a certain amount of body or viscosity so desirable for many industrial applications. It is unnecessary to incorporate such materials as casein, glue, etc. in order to stabilize emulsions prepared with these salts. Thickening agents now in use include such protein materials such as casein, gelatin, albumin, etc. all of which present difficulties in actual usage due to their variable nature and their tendency to putrefy. The products of this invention are uniform in composition and behavior and have no tendency to putrefy.

The preparation of emulsions and dispersions using the compounds of the present invention is disclosed and claimed in my copending application Serial No. 103,456, filed September 30, 1936.

The above description and examples are intended to be illustrative only. Any modification of or variation therefrom which conforms to the spirit of the invention is intended to be included within the scope of the claims.

I claim:

1. An ammonium salt of an organic monobasic acid wherein one and only one ammonium hydrogen is replaced, and that by a monovalent organic radical containing, attached to the nitrogen atom, an hydroxyl substituted hydroaromatic ring.

2. A salt of an organic monobasic acid and orthohydroxycyclohexylamine.

3. An ammonium salt of an aliphatic monobasic acid wherein one and only one ammonium hydrogen is replaced, and that by a monovalent organic radical containing, attached to the nitrogen atom, an hydroxyl substituted hydroaromatic ring.

4. A salt of an aliphatic monobasic acid and orthohydroxycyclohexylamine.

5. An ammonium salt of stearic acid wherein one and only one ammonium hydrogen is replaced, and that by a monovalent organic radical containing, attached to the nitrogen atom, an hydroxyl substituted hydroaromatic ring.

6. Orthohydroxycyclohexylammonium stearate.

7. Process of preparing orthohydroxycyclohexylammonium stearate, which comprises heating stearic acid to about 85° C. and adding thereto an equivalent amount of orthoaminocyclohexanol at such a rate that the temperature of the mixture does not greatly exceed 85° C.

8. Process of preparing orthohydroxycyclohexylammonium stearate, which comprises heating stearic acid and mixing therewith ortho aminocyclohexanol the reaction mixture being maintained at a temperature sufficient to cause salt formation but below that at which amide formation occurs and the reaction being discontinued before amide formation occurs.

9. Process of preparing useful dispersing and thickening agents, which comprises heating a fatty acid with ortho aminocyclohexanol the reaction mixture being maintained at a temperature sufficient to cause salt formation but below that at which amide formation occurs and the reaction being discontinued before amide formation occurs.

10. Process of preparing useful dispersing and thickening agents, which comprises heating a fatty acid with a primary hydroxyhydroaromatic amine the reaction mixture being maintained at a temperature sufficient to cause salt formation but below that at which amide formation occurs and the reaction being discontinued before amide formation occurs.

11. Process of preparing useful dispersing and thickening agents, which comprises heating an organic monobasic acid with a primary hydroxyhydroaromatic amine, the reaction mixture being maintained at a temperature sufficient to cause salt formation but below that at which amide formation occurs and the reaction being discontinued before amide formation occurs.

12. Process of preparing orthohydroxycyclohexylammonium stearate which comprises heating stearic acid to 50–100° C. mixing therewith orthoaminocyclohexanol and discontinuing the heating.

13. Process of preparing useful dispersing and thickening agents which comprises heating a fatty acid to 50–100° C. with orthoaminocyclohexanol and thereafter discontinuing the heating.

14. Process of preparing useful dispersing and thickening agents, which comprises heating a fatty acid to 50–100° C. with a primary hydroxyhydroaromatic amine and thereafter discontinuing the heating.

15. Process of preparing useful dispersing and thickening agents, which comprises heating a monobasic organic acid to 50–100° C. with a primary hydroxyhydroaromatic amine and thereafter discontinuing the heating.

HAROLD S. HOLT.